United States Patent Office 2,713,981
Patented July 26, 1955

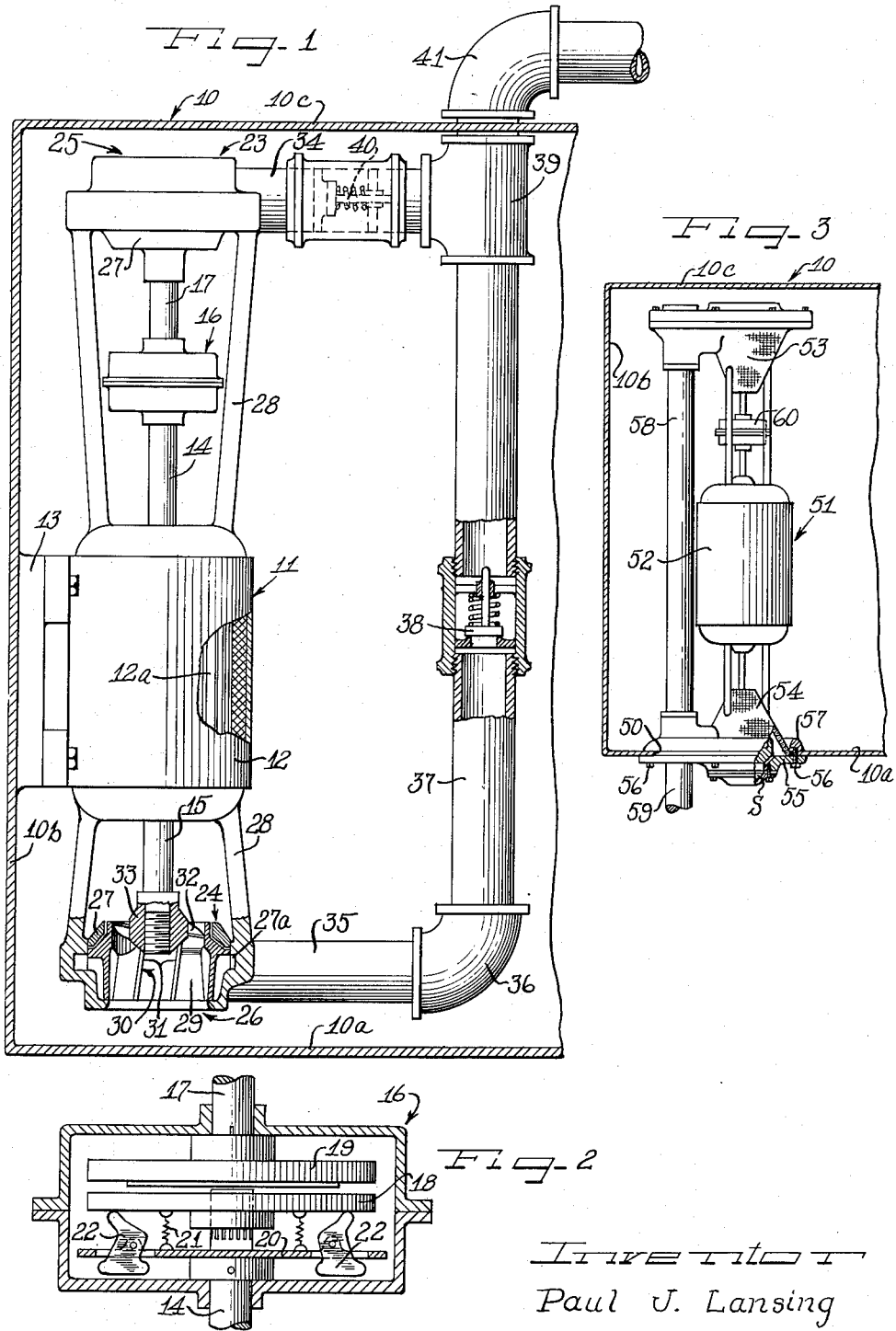

2,713,981

METHOD OF DELIVERING LIQUID FROM AN AIRCRAFT CELL UNDER ALL FLIGHT CONDITIONS

Paul J. Lansing, Los Angeles, Calif., assignor to Thompson Products, Inc., Cleveland, Ohio, a corporation of Ohio Application March 6, 1951, Serial No. 214,181

4 Claims. (Cl. 244—135)

This invention relates to the delivery of liquid from a tank in an aircraft under all conditions of flight of the aircraft and irrespective of the position of the liquid in the tank.

Specifically, the invention deals with the feeding of liquid fuel from an aircraft fuel cell in an uninterrupted stream under normal flying conditions as well as under abnormal flying conditions such as negative gravity diving conditions, inverted flight conditions, and the like.

This application is a continuation-in-part of my copending application entitled "Multiple Pump and Motor Unit for an Aircraft Fuel System," Serial No. 139,914, filed January 21, 1950.

In aircraft fuel systems, it is essential to supply fuel from the fuel cell or tank to the engine driven fuel pump or other engine fuel charging mechanism under all conditions of flight.

The modern high speed military type aircraft must perform efficiently during diving conditions, high angle climbing conditions, accelerating level flight conditions, and even in inverted flight conditions. Under many such extreme flight conditions, the fuel in a partially filled fuel cell will climb to the top and rear portions of the cell, where it is not accessible to the inlet of a conventional booster pump or other fuel intake to the engine driven fuel pump. For example, during a power dive, the downward acceleration may exceed acceleration due to gravity, and thereby produce what is known as a negative gravity condition wherein the fuel will rise to the top of the cell. Similar circumstances are encountered even in level flight, when the aircraft is accelerated continuously, thereby causing the fuel to collect at the rear portion of the cell. Of course, in inverted flight conditions, the top of the fuel cell becomes the bottom, and the fuel will fall away from the booster pump or other fuel feed from the cell.

Since a booster pump capable of eliminating vapors and gases from the fuel being fed to the engine must have its inlet completely submerged in the fuel, the normal booster pump, which has its inlet mounted at the bottom of the fuel cell, is not capable of continually supplying fully liquid fuel to the engine under the extreme flight conditions mentioned hereinabove.

Therefore, in accordance with this invention, there is provided a method of delivering liquid fuel from a fuel cell in an uninterrupted stream from a booster pump unit mounted in the cell and composed of a single motor and a plurality of motor driven pumps arranged so that the inlet of at least one pump will always be submerged in fuel in the cell irrespective of the position of the fuel. A preferred booster pump arrangement, used in the method of this invention, includes a separate booster pump at each end of an electric motor and a mounting for the unit which will position the inlet of one pump at or close to the bottom of the fuel cell while the inlet of the other pump is at or close to the top of the fuel cell. In addition, these pump inlets are preferably disposed toward the rear end of the fuel cell. Since, in a partially filled fuel cell, only the inlet of the bottom pump will be submerged in fuel during normal flight, the preferred booster pump unit for the method of this invention, includes a clutch for disconnecting the top pump from the motor until the inlet of the top pump is submerged in fuel. This clutch can conveniently take the form of a centrifugal clutch which will engage when the motor speeds up due to lack of fuel in the bottom pump. The preferred booster pump for the method of this invention also is equipped with check valves, so that the discharge from one pump will not flow into the other pump.

It is, then, an object of this invention to provide a method of delivering liquid from an aircraft fuel cell under all flight conditions by flowing the liquid to a conduit from adjacent the bottom of the fuel cell under normal flight conditions and by flowing the liquid to the same conduit from adjacent the top of the cell under abnormal flight conditions.

Another object of the invention is to provide a method of feeding fuel in a constant uninterrupted stream from an aircraft fuel cell by positioning several pump inlets at different levels in the fuel cell, so that at least one pump inlet will always be submerged in fuel under all flight conditions of the aircraft.

A still further object of the invention is to provide a method of supplying pressured fuel to an aircraft engine during negative gravity flight conditions as well as during normal flight conditions by means of a booster pump arrangement in the fuel cell of the aircraft which positions pump inlets at different levels in the fuel cell, so that at least one pump inlet will always be covered by fuel in the cell irrespective of the position of the fuel in the cell.

A still further object of the invention is to provide a method for supplying pressured gas and vapor free liquid fuel, such as gasoline, to an aircraft engine under all conditions of flight of the aircraft by pumping fuel from adjacent the top of the aircraft fuel cell under negative gravity conditions of flight or by pumping fuel from adjacent the bottom of the aircraft fuel cell under positive gravity conditions of flight while simultaneously centrifugally separating gases and vapors from the liquid being pumped to thereby pressure a constant stream of the fully liquid fuel.

Other and further objects of the invention will be apparent to those skilled in the art from the following detailed description of the annexed sheet of drawings which, by way of preferred examples, illustrates two embodiments of fuel cell and multiple booster pump unit arrangements for carrying out the method of this invention.

On the drawings:

Figure 1 is a vertical cross-sectional view through the rear portion of an aircraft fuel cell and showing a multiple pump and motor unit mounted in the fuel cell on the rear wall thereof.

Figure 2 is a vertical cross-sectional view, with parts in elevation, and on an enlarged scale, of a centrifugal clutch used in the pump and motor unit of Figure 1.

Figure 3 is a view similar to Figure 1 but illustrating the pump and motor unit mounted on the bottom of the fuel cell.

As shown on the drawings:

In Figure 1, the reference numeral 10 designates an aircraft fuel cell. Such a fuel cell 10 might be included in the wing or the fuselage of the aircraft. The cell 10 includes a bottom wall 10a, a rear wall 10b, and a top wall 10c. In addition, a front wall (not shown) is also provided. A pump and motor unit 11 has an electric motor 12 mounted on the rear wall 10b of the cell 10 intermediate the top and bottom walls as by means of any suitable hanger or mounting bracket 13. The motor 12 has an armature 12a driving a top drive shaft 14 and a bottom drive shaft 15 respectively projecting from the top and bottom of the motor. The motor is preferably of the type which will speed up when the load thereon is reduced. Motors such as straight series wound and compound wound with emphasis on the series winding are effective.

The top drive shaft 14 is coupled through a centrifugal clutch 16 to a driven shaft 17. As shown in Figure 2, the clutch 16 includes a driving disk 18 slidably splined on the drive shaft 14 and coacting with a driven disk 19 secured on the driven shaft 17. A plate 20 secured on the drive shaft 14 anchors springs 21 which pull the plate 18 away from the plate 19. Flyweights 22 are pivoted on this plate 20 and are arranged to fly outwardly under the influence of centrifugal force to force the clutch plate 18 against the clutch plate 19 thereby causing the shaft 17 to be driven from the shaft 14.

A top pump 23 is mounted on top of the motor 11 to be disposed close to the top wall 10c of the cell 10. A bottom pump 24 is mounted on the motor 11 to be disposed near the bottom wall 10a of the fuel cell. The pump 23 has an inlet 25 in the top thereof. The pump 24 has an inlet 26 in the bottom thereof. The pumps 23 and 24 are identical and each includes a pump casing 27 carried on posts or the like supports 28 from the ends of the motor 12. The pump casing 27 defines an annular pumping chamber or volute 27a communicating around its inner periphery with a central open ended chamber 29. A vapor separating type impeller 30 is mounted in this central chamber 29 and includes a ring of radial pumping vanes 31 effective to pressure liquid into the volute 27a. Screw vanes or spaced propeller blades 32 connect the ring of vanes at their upper ends with the impeller hub 33 and this hub is secured to the drive shaft which in the case of the upper pump 23 is the shaft 17 and in the case of the lower pump 24 is the shaft 15.

The space in the central chamber 29 surrounded by the ring of pumping vanes 31 is in full open communication with fluid in the fuel cell 10 provided that the fuel covers the pump casing and inlet of the pump. This fuel is subjected to the centrifugal action of the pumping vanes and the heavier liquid components are discharged through the pumping or volute chamber 27a into peripheral discharge outlets including an outlet 34 for the top pump 23 and an outlet 35 for the bottom pump 24. The screw vane 32 is effective to cause an axial flow through the open ended chamber 29 to discharge bubbles of gases or vapors from the chamber and back into the fuel cell, so that only fully liquid material will be pumped into the pumping chamber. These bubbles will rise to the top of the fuel and burst at the surface level. The liberated gases and vapors are then vented out of the cell.

The bottom outlet 35 extends laterally from the pump casing 27 and is connected through an L 36 to an upstanding pipe 37 containing a spring-pressed check valve 38. This valve accommodates flow upwardly through the pipe 37 but prevents flow in the reverse direction. The upper end of the pipe 37 is connected to a T 39 which makes a right angle connection with the upper discharge conduit 34 from the pump 23. A check valve 40 is provided in the conduit 34 to accommodate flow from the pump 23 to the T 39 and to prevent flow in the reverse direction into the pump. An outlet tube 41 is connected to the top of the T to convey the fuel out of the cell 10.

In normal operation the unit 11 has the bottom pump 24 thereof submerged in fuel in the cell 10. Under such conditions the motor 12 will drive the shaft 15 at a moderate speed because of the liquid load on the pump impeller and the impeller will be effective to centrifugally pump fully liquid fuel through the outlet 35 while at the same time eliminating gases and vapors out of the upper end of the pump back to the fuel cell. However, when the inlet 26 of the pump 24 is uncovered, as during abnormal flight conditions, the impeller in this bottom pump will be free and unimpeded by the fuel. The drive shaft 15 will therefore have less resistance to rotation and the motor 12 will speed up. This speeding up of the motor will cause the weights 22 of the clutch 16 to fly outwardly and engage the clutch for driving the drive shaft 17, whereupon the impeller in the top pump will be driven, since the liquid fuel during these abnormal flight conditions will climb to the rear and top of the fuel cell and, since the inlet 25 of the top pump 23 is adjacent the top and rear end of the fuel cell, this inlet will be covered with fuel even though the normal fuel level of the cell is below the top inlet. Therefore, under these abnormal flight conditions, the impeller in the top pump will be effective to flow the fully liquid material through the outlet 34.

When the bottom pump is pumping fluid and the top pump is not pumping fluid, the check valve 38 will accommodate flow from the bottom pump while the check valve 40 will prevent flow from this pump back to the idle pump 23. Conversely, when the top pump is effective and the bottom pump is ineffective, the check valve 40 will accommodate flow to the outlet 41 while the check valve 38 will prevent flow back to the pump 24.

When both pumps are submerged and it is desired to utilize the pumping capacity of both pumps, as during take-off flight conditions and the like, the motor 12 can be speeded up sufficiently to engage the clutch 16, whereupon both pumps will be effective and an increased pumping capacity will be obtained.

In the event that it is desired to mount the multiple pump and motor unit on the bottom wall of the fuel cell, the arrangement shown in Figure 3 can be used. In this arrangement, the fuel cell has an opening 50 in the bottom wall 10a thereof adjacent the rear wall 10b and a pump and motor unit 51 is inserted through this opening and supported from the bottom wall 10a. This unit includes an electric motor 52, a top pump 53 on top of the motor 52, and a bottom pump 54 at the bottom of the motor 52. The bottom pump, however, is equipped with a base plate 55 that closes the opening 50 and is suspended from the bottom wall 10a by mounting bolts 56 which are threaded into a mounting ring 57 disposed on the bottom wall 10a around the opening 50. This base plate arrangement forms a sump S at the bottom of the fuel cell 10 and this sump is in full communication with the inlet of the bottom pump 54 and with the interior of the fuel cell. In this bottom mounting, the entire unit 51 can be inserted into the cell through the opening 50. The pumps 53 and 54 discharge through a common outlet conduit 58 which also extends through the base plate 55 to receive the fuel line 59 to the engine driven fuel pump of the aircraft.

A centrifugal clutch 60 can be provided in the drive shaft from the motor 52 to the top pump 53. The unit 51 will thereupon function in the same manner as the unit 11 described hereinabove.

From the above descriptions, it will be understood that this invention provides a method of delivering vapor and gas freed liquid fuel, such as gasoline, in a constant uninterrupted pressured stream from an airplane fuel cell irrespective of the conditions of flight of the aircraft. In carrying out the method, a multiple pump and motor unit is mounted in the aircraft fuel cell in such a manner that one of the pumps of the unit will always be covered by fuel in the cell even during periods of abnormal flight including negative gravity flight conditions. The unit is preferably positioned adjacent the rear wall of the fuel cell, since the fuel tends to pile up toward the rear of the cell under certain flight conditions. The pumps of the unit are of the vapor separating type and are effective to separate gases and vapors from the liquid fuel while pressuring only the fully liquid fuel into the fuel line. The unit is effective as a high altitude booster.

It will be understood that modifications and variations of the method may be effected without departing from the scope of the novel concepts of the herein claimed invention.

I claim as my invention:

1. The method of delivering a constant uninterrupted stream of liquid from an aircraft fuel cell under all flight conditions of the aircraft which comprises pumping liquid under positive pressure from within the body of liquid adjacent the bottom of the aircraft fuel cell when the flight condition of the aircraft is such that the liquid is resting on said bottom of the cell, pumping liquid under positive pressure from within the body of liquid at the top of the aircraft fuel cell when flight conditions cause the liquid to be supported at the top of the fuel cell, and continuously delivering liquid fuel from the cell from either adjacent the bottom of the cell or adjacent the top of the cell in vapor-free uninterrupted stream under positive pressure.

2. The method of feeding fully liquid volatile fuel from an aircraft fuel cell having top and bottom portions respectively supporting the fuel under negative and positive gravity flight conditions which comprises pumping fuel from adjacent the bottom wall of the fuel cell under positive gravity flight conditions, pumping fuel from adjacent the top wall of the fuel cell under negative gravity flight conditions, simultaneously separating gases and vapors from the liquid being pumped, returning the separated gases and vapors back to the fuel cell, and flowing an uninterrupted pressured stream of the fully liquid fuel out of the fuel cell irrespective of changes in the flight conditions of the aircraft.

3. The method of feeding fully liquid volatile fuel from an aircraft fuel cell which comprises pumping fuel from the lower portion of the fuel cell during normal flight conditions, pumping fuel from the top portion of the fuel cell during abnormal flight conditions, centrifugally separating gases and vapors from the liquid being pumped, returning the separated gases and vapors back to the fuel cell, and constantly pressuring an uninterrupted stream of fully liquid fuel out of the fuel cell from either the bottom portion or the top portion of the fuel cell or from both the top and bottom portions of the fuel cell.

4. The method of delivering fuel from an aircraft fuel cell without interruption due to changes in flying conditions of the aircraft which comprises forcing fuel under positive pressure from a low level in the fuel cell during positive gravity flight conditions of the aircraft, forcing fuel under positive pressure from a high level in the fuel cell during negative gravity flight conditions of the aircraft, forcing fuel under positive pressure from the rear end portion of the fuel cell during high angle climbing and accelerated level flight conditions of the aircraft, and automatically shifting said fuel forcing action between said different positions in the fuel cell without interruption of the fuel flow as the flight conditions of the aircraft change.

References Cited in the file of this patent

UNITED STATES PATENTS

| | | |
|---|---|---|
| 1,871,055 | Hasbrouck | Aug. 9, 1932 |
| 2,415,972 | Stinson | Feb. 18, 1947 |
| 2,446,612 | Saurer et al. | Aug. 10, 1948 |
| 2,546,034 | Lansing | Mar. 20, 1951 |
| 2,547,246 | Aspelin | Apr. 3, 1951 |

FOREIGN PATENTS

| | | |
|---|---|---|
| 573,288 | Great Britain | Nov. 14, 1945 |